United States Patent [19]

Rentsch

[11] Patent Number: 5,541,396
[45] Date of Patent: Jul. 30, 1996

[54] METHOD OF REPRESENTING BINARY DATA

[76] Inventor: Frederic Rentsch, Augustinergasse 44, 8001 Zürich, Switzerland

[21] Appl. No.: 278,884

[22] Filed: Jul. 22, 1994

Related U.S. Application Data

[63] Continuation-in-part of Ser. No. 148,423, Nov. 8, 1993, abandoned, which is a continuation of Ser. No. 733,171, Jul. 19, 1991, abandoned.

[51] Int. Cl.⁶ .................................................. G06K 19/06
[52] U.S. Cl. ................................................................ 235/454
[58] Field of Search ....................................... 235/494

[56] References Cited

U.S. PATENT DOCUMENTS

| | | | |
|---|---|---|---|
| 4,782,221 | 11/1988 | Brass et al. | 235/494 |
| 4,786,940 | 11/1988 | Daniel | 347/129 |
| 4,924,078 | 5/1990 | Sant'Anselmo et al. | 235/494 |
| 4,947,383 | 8/1990 | Hudson | 235/494 |
| 4,998,010 | 3/1991 | Chandler et al. | 235/494 |

FOREIGN PATENT DOCUMENTS 2090446  7/1982  United Kingdom ............... 235/494

Primary Examiner—John Shepperd
Attorney, Agent, or Firm—Walter C. Farley

[57] ABSTRACT

A method for graphically representing binary data in a condensed, machine-readable form, includes forming a pattern of information-carrying frame and synchronization lines defining a geometric reference system which forms boundaries of one or more data fields. The reference system carries machine-readable marks such as a bar code identifying the pattern as a data-field reference system and providing orientation and other information. The reference system also includes synchronization lines forming boundaries of each data field and providing a location reference. Within the reference system the data field has dot locations functioning as data-transmission elements. Each location has or lacks a mark, representing a "1" or "0" binary bit. Each data element location has a known geometric relationship to the synchronization lines of the reference system so that coordinates of each individual mark can be determined precisely.

10 Claims, 11 Drawing Sheets

Example of human-readable text in a field not containing binary data

10b

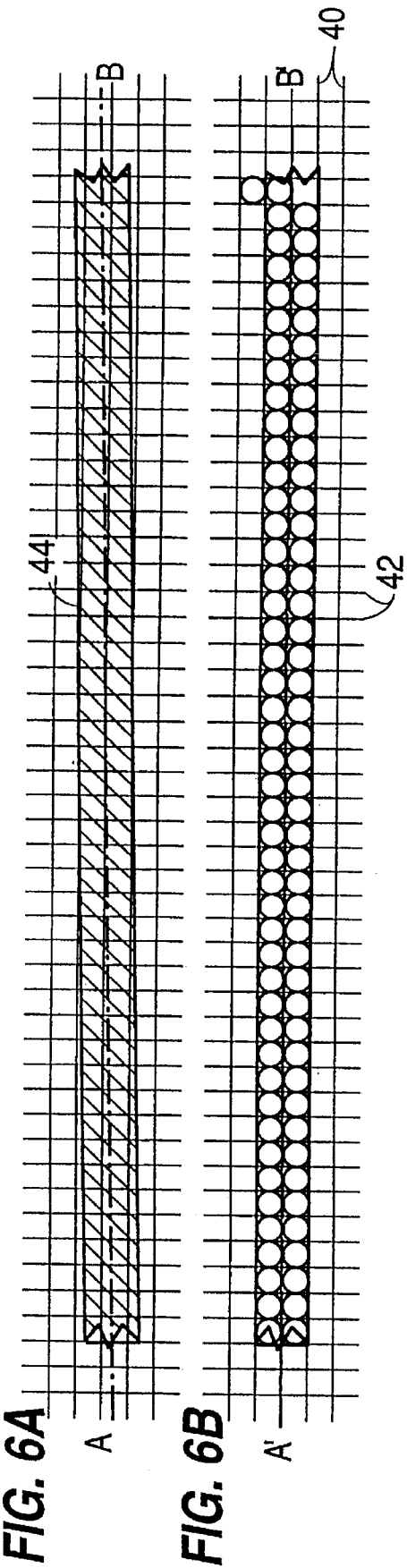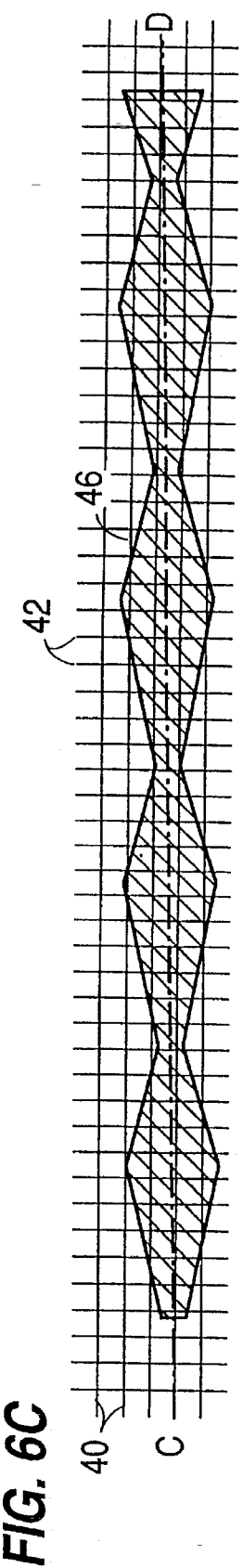
FIG. 6A  FIG. 6B  FIG. 6C  FIG. 6D

10d

METHOD OF REPRESENTING BINARY DATA

CROSS-REFERENCE TO RELATED APPLICATION

This application is a continuation-in-part of U.S. Ser. No. 08/148,423 filed Nov. 8, 1993 now abandoned which was a continuation of Ser. No. 07/733,171 filed Jul. 19, 1991, now abandoned.

FIELD OF THE INVENTION

This invention relates to a method for representing binary data in a graphic array so that it can be recorded in a tangible form such as being printed by means of standard commercial printing processes. Such printed data can then be reconstituted to its original binary form by means of an image scanner and a computer program that extracts the binary data from the scanned image.

BACKGROUND OF THE INVENTION

OCR

Optical Character Recognition (OCR) technology is widely used for regenerating text data from printed texts. OCR is essentially a software technology that handles the conversion of image data to binary text data.

The reliability of OCR is not perfect, but improvements are still being made. OCR, despite its imperfections, is very usable as a data acquisition tool in electronic text editing. It does not follow, however, that OCR is a technology that is well suited to be a communication vehicle between machines. There are three arguments against it: First, the graphic appearance of alphabetic letters (or numbers) responds to the requirements of human readers. Reading them with a machine commits far more processing resources to the task of character recognition than would have to be mobilized for the recognition of graphic symbols purposely designed for machine readability. The extra effort can only be justified in terms of adding value to primarily human-readable text systems. Second, the data density per area of printed matter in the case of human-readable text falls far short of the limits of the involved technologies. Third, each binary code (0 to 255) cannot be represented by a character. Only about one third of the 256 binary codes are unequivocally assigned to characters. Others are assigned to characters in a non-standard way and some codes have no character assignments. Spelling out numbers, each one with two hexadecimal digits, would solve the problem but at the expense of further deteriorating the achievable data density.

Bar Codes

Several bar code formats are in wide use today, mainly for product identification. Bar codes encode information in one direction only, generally along a line. The perpendicular direction encodes no information, but carries redundancy, extending the horizontal data pattern over a comparatively large area, so that the pattern retains its functionality even with a certain degree of degradation and so that the bar code requires little mechanical coordination in aligning the reading machine with the pattern.

Bar codes store little information. They are well-suited for storing machine-readable identification codes, but for the transmission of bulk data, bar codes require far too much printed area per data unit to be of practical use. They typically occupy many times the area regular text would. By shortening the redundancy dimension of a bar code pattern, its data density could be proportionally increased. But the required accuracy of reader alignment would become more stringent in equal proportion.

In exceptional circumstances, very small amounts of data proper need to be conveyed. Bar codes are then appropriate to convey such data. An example would be timing information some TV program guides publish in the form of bar codes. Programming a video recorder to record a specific program becomes a simple matter of pulling a bar code reader pen across the pattern for the desired program.

Dot Codes

Dot code systems use both dimensions of a flat surface to record information. Dot codes are inherently hard to read. They require precise synchronization of the reading apparatus with the data pattern. Namely, the data read is a reconstructed sequence of the original data only if the reader is accurately aligned with the rows of data dots. This requirement is all the more exacting in the light of the high data densities dot code systems attempt to achieve and the correspondingly fine dot screens they would employ.

If a reading machine is not synchronized or aligned with the data pattern, sequentiality is lost and would have to be reconstructed. Some kind of reference information would have to be introduced as a synchronization aid, as such information is essentially impossible to extract from the dot pattern itself (autocorrelation).

Dot code systems of the first kind (synchronized reader) have been proposed. They focus on reader synchronization, their major technological component. Such systems have not been successful in the marketplace. They necessitate dedicated high-precision machinery whose cost might well offset the benefits of their use.

SUMMARY OF THE INVENTION

Accordingly, an object of the present invention is to provide a method of representing binary data in a machine readable graphic form. Data so represented is able to carry relatively large amounts of data per unit area, to be reproduced by traditional photomechanical means and to be reconverted to their original binary form using low-cost image scanners. The method furthermore offers great flexibility in arranging a data rectangle in terms of scale and aspect ratio.

Briefly described, the invention centers on the idea that a judicious design of dot code patterns combined with an appropriate encoding and decoding software will endow available machinery with new capabilities in such a way that a novel method of data transmission can be cost-effective, which it manifestly cannot as long as its realization requires dedicated hardware.

The essence of the invention is a machine-readable graphic reference pattern that can be located with great precision by the reconstituting program. From this reference pattern the program is able to calculate the exact position of the graphic elements that contain the data proper. Thus the reference pattern and the data proper constitute a systematic unit which in the proposed form has the additional advantage of permitting combining such units in scalable rectangular arrangements of selectable aspect ratios.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this disclosure, and wherein:

FIGS. 6A, 6B, 6C and 6D are illustrations of synchronization lines for explanation of the lines used in the present invention;

DESCRIPTION OF THE PREFERRED EMBODIMENTS

Figure 1:
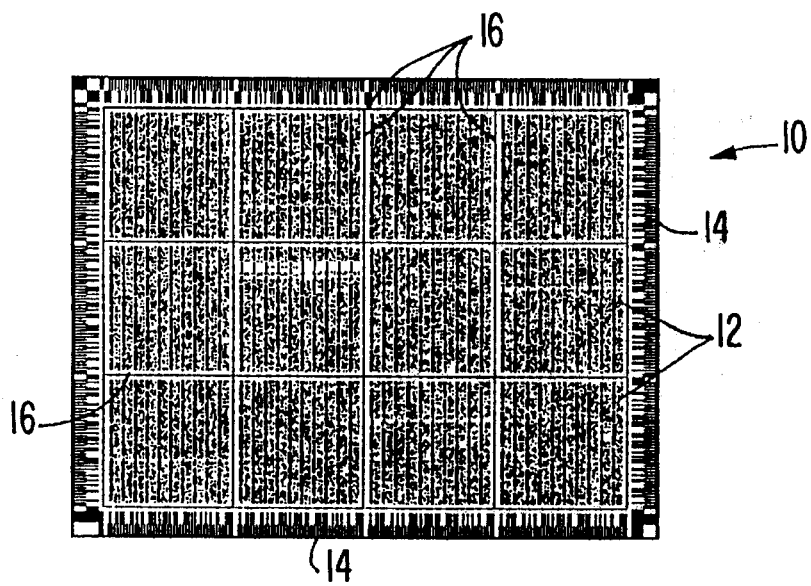
FIG. 1 is a view of a data array in accordance with the present invention.

Although the present invention has utility is several possible areas, it will be described in the context of conveying data in the form of printed matter. In the past, if a publisher of a magazine wished to supply its readers with computer programs or quantities of data, the publisher had the option of providing the data or program as a human-readable printed list, or supplying the code on a diskette which had inherent problems of packaging and shipping because of the difference in nature between the magazine and the diskette. In the human readable form, the reader/customer was required to key the code into his machine in order to make use of it, an overwhelming task with large amounts of data or long programs. Printing the data in the magazine in a machine readable form is a much superior solution to this problem because the printed medium is consistent with the nature of the magazine and is producible in the same way as the remainder of the magazine. Efforts to implement this general concept in the recent past have, however, not been entirely successful.

For the purpose of machine-reading data patterns, the use of image scanners is contemplated. Image scanners are rapidly gaining popularity as components of desktop publishing systems and are used as the input components of both picture material and text for OCR systems. They are today marketed in the high-volume segment of non-professional computer users. Their prices are accordingly low and coming down. Image scanners capture graphic data in the form of bit maps. They are, by themselves, ill-suited for extracting data from dot patterns because they have no means at all to ensure alignment between the mechanical components of the scanner and a dot pattern. The invention, consequently, relieves the scanner of the task of extracting the original data from the pattern and instead accepts from the scanner an image bit map, like the bit map of any other scanned graphic material. Next, the data is extracted from the bit map by a computer program. In order for that program to perform satisfactorily, the configuration of the data dot pattern is crucial. The invention specifies the essential characteristics of that configuration as follows:

1. Identification of a Data Pattern

In accordance with the invention, a pattern is identified by its frame, that identification including distinguishing the pattern from extraneous print. The pattern identification function begins with the recognition of a continuous, uninterrupted perimeter line or band forming a rectangle enclosing one or more data fields. After this frame is recognized, the identification process proceeds to the interpretation and measurement of various frame components. These frame components have an explicit function of expressing the scale or measurements of the pattern and the implicit function of validating the pattern.

Pattern measurement consists basically of a sequence of decoding steps, each of which inherits scale or measurement data from the previous step, then performs its specific analysis and finally passes improved data on to the next step. Pattern validation implicitly results from the extraction of meaningful and consistent data along the entire iteration line. A pattern is recognized as either illegible or invalid the moment the measuring sequence ceases to yield coherent data.

2. Spatial Orientation of Data Pattern

The orientation of the data area is recognizable by specific markings that may be placed in the frame or within the frame and that may perform other functions as well. By "orientation" is meant "top", "bottom", "left" and "right". It is necessary to detect the orientation of the data area, else the tail end of the data stream could be confused with its beginning.

3. Scanner Calibration

Reading binary data is more error-critical a process than capturing picture data. Calibration errors that are tolerable for picture scanning may defeat the extraction of binary data. Accordingly, they should be detected and either fed back into the machine for corrective action or reported as the cause of failure. Black and white reference areas of equal size should generate equal amounts of white and black readings and can be used for brightness calibration as will be described.

4. Subdivision into an Array of Synchronization Fields

By dividing the area of a data pattern into an array of synchronization fields each having an essentially square shape and comparatively small size, a great degree of freedom is achieved in terms of pattern dimensioning and pattern formatting.

A. Pattern Dimensioning: As the decoding process calculates the presumed or theoretical position of each data dot by linear interpolation with reference to fixed points whose positions have been measured, that presumed position will coincide with the dot's actual position only within the tolerance inevitably introduced by the usual, small linearity shortcomings of medium and hardware. One way to cope with linearity errors is to keep the distance between each dot and its nearest reference marks small. This is accomplished by the synchronization fields: four intersections of four synchronization lines bordering the field are the fixed points with reference to which the field's data dots are located by linear interpolation, Thus, distortion (linearity errors) on a scale exceeding the lateral dimension of a synchronization field ceases to be of concern. It follows that by subdividing a pattern in the described manner into an array of synchronization fields, the possibility of linearity errors places no restrictions upon a pattern's overall size.

B. Pattern formatting: By varying the arrangement of a pattern's synchronization fields, its aspect ratio can be varied. Possible arrangements for a twelve-field pattern are thus 1×12 (one column of 12 fields each), 2×6, 3×4, 4×3, 6×2 and 12×1.

5. Statistically Locatable Synchronization Lines

A means of dot location that is guaranteed accurate to within a small fraction of the scanner's resolution is provided by a geometric reference system of a very particular design: the reference lines (synchronization lines) have zig-zag shaped edges, i.e., the reference lines periodically increase and decrease in width along their lengths. Such edges, when imaged by an orthogonal grid of scanner readings, which is what scanners produce, appear correctly positioned even when the axis of the line happens to be in alignment or near-alignment with the scan grid.

The reason for using a zig-zag line is based on the fact that a straight edge in angular alignment with the scan direction cannot be represented by the bit map with a positional accuracy better than one scanner resolution unit. This is so because two adjacent image dots astride a black-white color transition represent that color transition as lying exactly halfway between the dots, one dot being black and the other being white. Moving the transition toward one or the other dot will not change the image at all as long as the movement stops just short of the center of either dot. Consequently, the discrepancy between the image of the transition and the actual position of the transition can be as great as ± the radius of the dot which the scanner covers when making a reading, in other words, one scan resolution unit overall.

Considering this phenomenon as applied to a straight line, it follows that, if an edge of the line is aligned either horizontally or vertically, the edge will be imaged by a linear array of dots of one color and an adjacent linear array of dots of the other color. The image of the edge appears exactly between the two rows of dots although it can be off relative to the real edge location by as much as a dot radius in either direction perpendicular to the line. The problem is acute in this case because an entire chain of dot pairs representing the line edge misrepresents its position in the same direction. When the lines are substantially out of angular alignment relative to the scan direction, the problem is less severe because each dot pair sitting astride the edge misrepresents its position by an amount and in a direction that is typically random, so the misrepresentations along the line cancel statistically. The bitmap records the position of such a misaligned line accurately to within a small fraction of the scanner's resolution. By giving the reference lines zig-zagging edges, the present invention ensures that the misrepresentations of the actual edges by all involved pixel pairs cancel out statistically, even in the event of angular alignment. The practical advantage which this yields is the feasibility of reliable performance with smaller dots, permitting higher density of data, i.e., more data per unit area.

Another way of explaining the feature is this: A scanner reading that falls on an edge of a line will be the color of the line if its center lies just within the line edge and will be the opposite color if it lies just without. If the line has a zig-zag edge, the precise lateral offset from the line axis where the color of the reading reverses varies along the line, since the line periodically changes in width and so alternatingly exposes more or less area for readings to hit. As the line width varies smoothly and linearly, it follows that within a zone of uncertainty artificially created by the zig-zag, a reading will, or will not, register the line with a probability that is directly proportional to its lateral offset component within that zone of uncertainty, i.e., within the amplitude band of the zig-zag. In consequence, the disclosed sync-line-location method has a statistical accuracy potential that is not limited by the scanner's resolution. The realization of this statistical accuracy potential is definitely assured by the great number of readings used to image a sync line.

The phase, or period, of one zig-zag is preferably chosen to extend over several resolution units, so as to make the zig-zag shallow. The periodicity of the zig-zag is preferably numerically decoupled from the periodicity of the scans, so that they have no common integer divisors.

In summary, it may be said that zig-zagging of a synchronization line's borders serves to statistically soften its outlines and to yield more accurate regressions. The benefit of the artifact diminishes as the scanning resolution increases and becomes both unfeasible and unnecessary by the time the scan resolution attains the resolution of the print.

While commercial production equipment is perfectly suited to generating sync lines as described, most office-quality laser printers are not, on account of their moderate resolution capabilities. This does not, however, categorically disqualify the invention for use in office environments. Straight-edged lines are entirely feasible, albeit with a certain performance disadvantage. The disadvantage can be compensated either by using larger data dots, resulting in lower data densities, or by rendering operators aware that angular alignment of patterns with the scan may cause the extraction of the data to fail. The recommendation to rotate a pattern out of alignment in this case would neither evidence poor system design, nor impose on the operator to any extent.

6. Data Dot Screens

The screen arrangements of greatest interest are triangular and orthogonal dot screens (honeycomb and checkerboard, respectively). Triangular arrangements are preferable in terms of achievable data density if the direction of the scan is unpredictable. Orthogonal patterns, on the other hand, are superior if the direction of the scan is predictably oriented parallel to the pattern within some practical margin of deviation. The production of triangular dot arrangements requires higher resolution that the production of orthogonal arrangements.

Triangular dot patterns appear to be best suited for automated industrial systems upon which the omnidirectional pattern will not impose the task of physical pattern alignment.

Orthogonal dot arrangements are a natural choice for publishing and for office systems in which approximate pattern alignment is ensured by the orthogonal reference system deeply rooted in human perception: scanners have rectangular windows accommodating rectangular sheets of paper whose graphic contents can be relied on to be organized on an orthogonal grid in the interest of economy. Regarding pattern making, the correspondence-quality laser printers available in most office environments have adequate resolution to produce the desired orthogonal patterns, although they will not achieve the data densities which commercial printing equipment is capable of achieving.

The requirement of angular alignment for orthogonal patterns seems to contradict the requirement of angular misalignment in the presence of straight-edged synchronization lines produced with a moderate-resolution printer. In practice, there is a workable range of angular misalignment between about 5 and 15 degrees wherein the straight-edged sync lines are sufficiently misaligned and the orthogonal grid is sufficiently aligned for both to perform well.

The nature of the described arrangements is determined not so much by the shape of the dots (in the dimensions under consideration, data dots will be essentially circular) but by the grid of the screen or array that defines the placement of the dots. A triangular arrangement places the dots on a sixty-degree grid, an orthogonal arrangement on a ninety-degree grid. The enumeration of the above six basic elements or procedures follows more practical imperatives than systematic or logical ones. Functions, which in this disclosure appear associated with a particular element, may in practice be distributed to two or more elements. Conversely, two or more functions may be handled in combination by one single element.

Some advantages of the present invention over current technologies can be summarized as follows. As compared with OCR, the method of the invention provides greater data density, 20 times greater or more. All binary codes 0 to 255 can be transmitted, not only the subset with standardized character assignments. Computer programs or formatted data require all 256 codes. The transmission of the codes is not symbolic but numeric, hence unequivocal. (In contrast, the assignment of characters to binary codes follows various standards). The present invention also provides for error-resistance. OCR systems don't provide for error checking and error correction. A strictly numerical system lends itself well to the incorporation of error-correction procedures.

As compared with bar codes, the invention provides vastly greater data density, easily 100 times greater.

Compared with other dot code systems, the proposed pattern technique permits large-area coverage of fine data screens, resulting in a transmission capacity of 200 Kilobytes or more per 8.5×11" page, using error correction and data compression.

The system requires no special skills on the part of the user. It uses readily available hardware rather than dedicated and expensive precision tools. Added value is created.

Further advantages are that the resolution (fineness of the data screen) is variable, that the aspect ratio of data fields is selectable, and new benefits can be derived from existing infrastructures.

The invention does not involve unique combinations of hardware. A system capable of "reading" and interpreting data in accordance with the invention typically includes a scanner capable of viewing a printed data array or arrays and producing a bit map thereof at a resolution of at least 300 DPI and a computer, such as a conventional personal computer connected to receive and store in memory the bit map produced by the scanner. The computer should be able to accept and employ software for analyzing the bit map and should include a conventional monitor so that the software can be operated in a normal manner and so that commands and messages can be seen. None of these requirements are such that an ordinary computer readily available on the market would not suffice.

The following example of a configuration in accordance with the invention will demonstrate the principles discussed above. As seen in FIG. 1, a data field array of the invention indicated generally at 10 includes one or more dot code fields 12 of selectable dimension in terms of dots per field. The data field array can include any number of fields arranged in various ways so as to have various aspect ratios. Three elements are discernable:

1. An enclosing frame 14 that delimits the data within from any extraneous print outside of the frame. The data can thus appear on a page with other printed matter without giving rise to confusion about the location of the data;
2. An orthogonal network of synchronization lines 16; and
3. Twelve fields 12 of data dot screens.

Although the size and aspect ratio of the field array of the invention is not critical, it is important in any binary presentation system to be able to use the available space efficiently. The array shown in FIG. 1, which is approximately true scale, represents 592 bytes of data in each field 12, using an arrangement of 64×74 bits. This translates to a physical data density of 100 kilobytes per 8.5"×11" page. A square of about 3 cm on a side holds about 2368 bytes.

Figure 2:
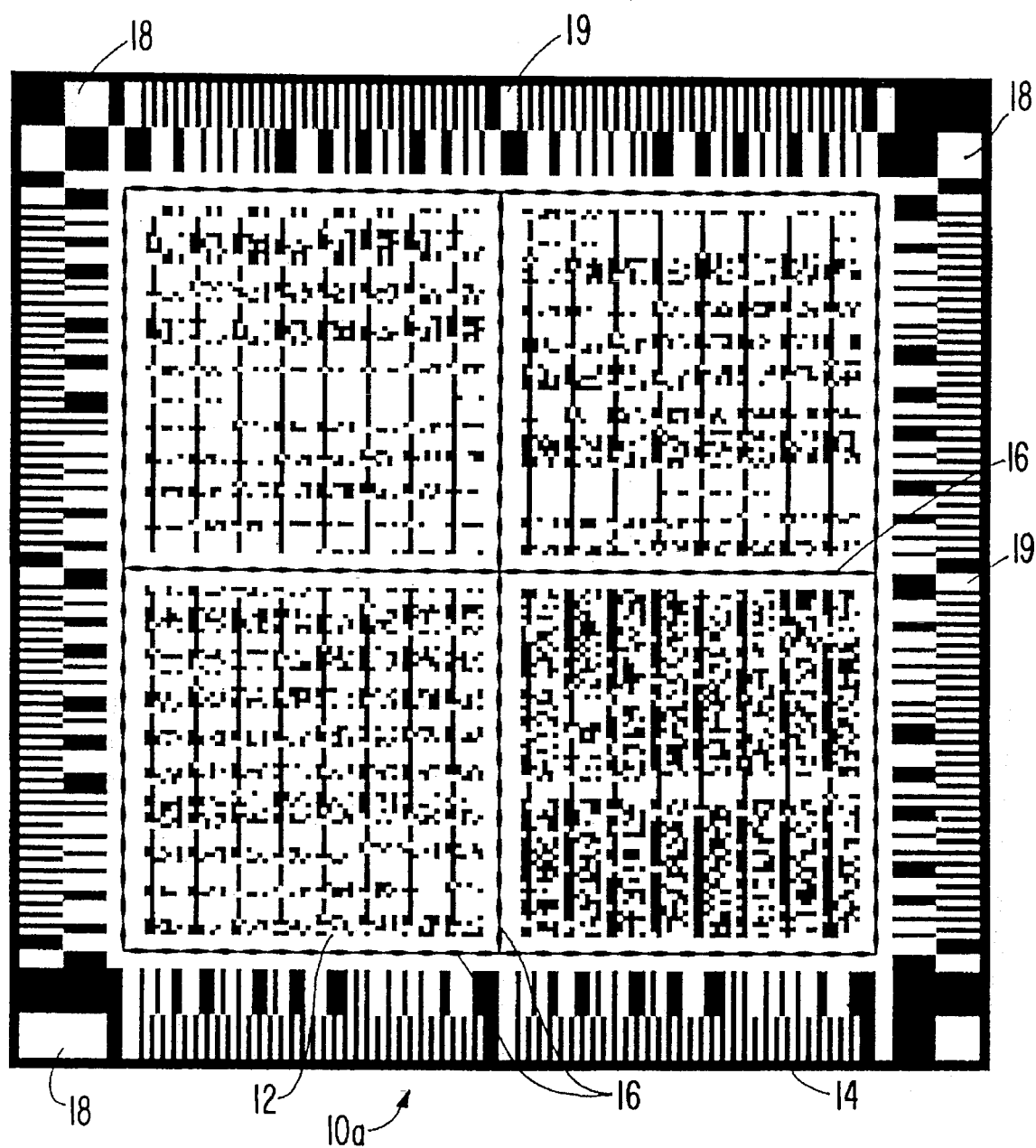
FIG. 2 is an enlarged view of the array of FIG. 1.

FIG. 2 is an enlarged view of an array 10a like FIG. 1 but with only four fields 12. In this figure are more clearly seen several white marks 18, 19 within the boundaries of the frame line 14 which provide information on the structural organization of the layout: orientation, scale, aspect ratio, and approximate location of the synchronization elements. In particular, the substantially square areas 18 near the corners of the frame occupy unique positions relative to the corners of the frame, thereby uniquely identifying those corners which constitute the "top" of the array, i.e., that edge which is parallel with the bit sequence. Areas 19 are substantially aligned with the synchronization lines 16, indicating to the reading system where to start looking for those lines. The number of marks 19 along the top edge and of marks 19 along a side edge define the aspect ratio of the array.

Figure 3:
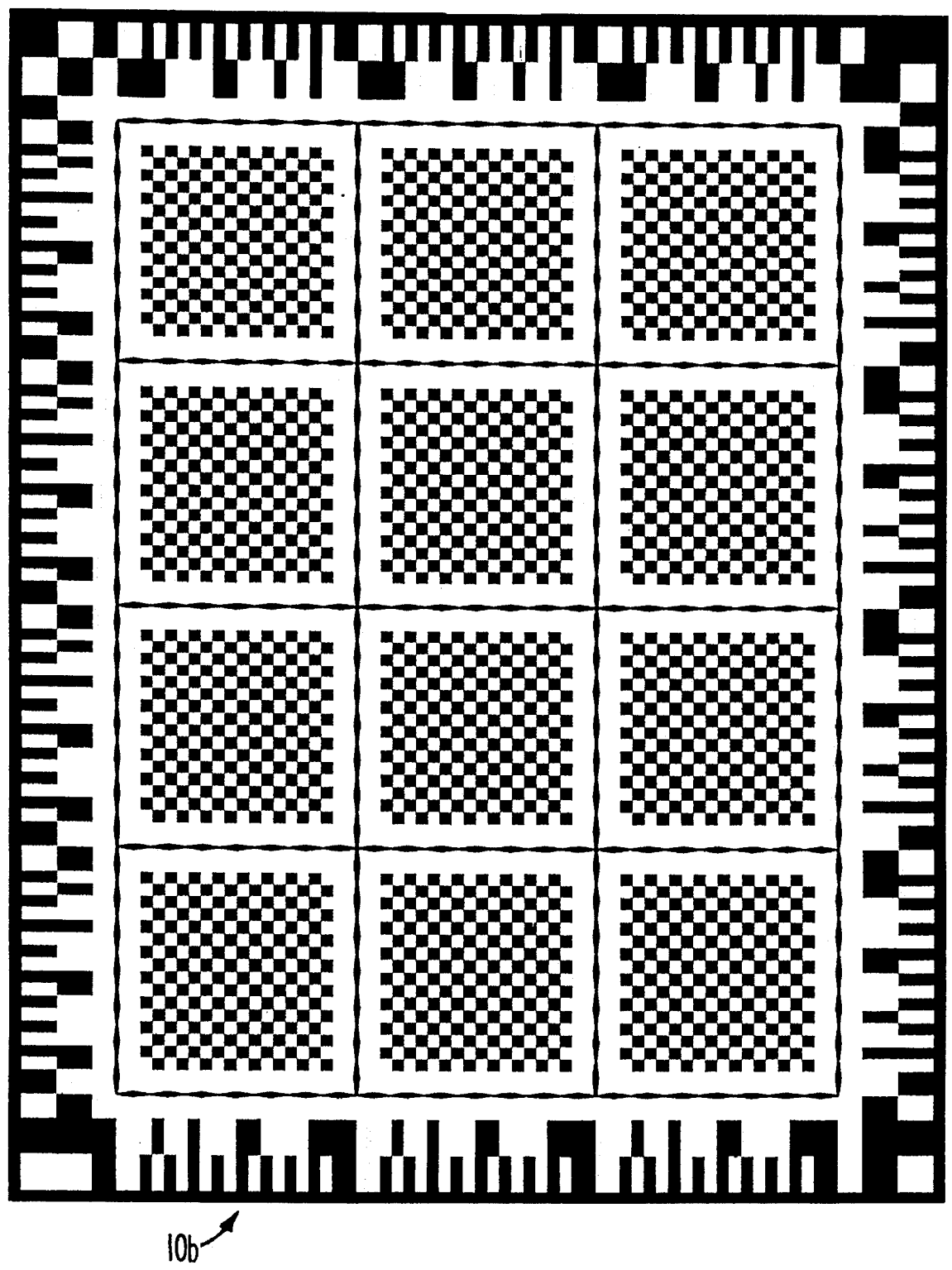
FIG. 3 is a further enlarged view of the array of FIGS. 1 and 2 with the data points further enlarged relative to the surrounding frames.

FIG. 3 is a still further enlargement of an array 10b using the principles of FIGS. 1 and 2, but in FIG. 3 the data dots have deliberately been made too large in relation to the organizational elements of the pattern, in order to render the field geometry visible. Also, the data used to generate the field patterns consist of bits indefinitely alternating between "set" and "clear". It will be apparent that the dots are placed on a rectangular grid.

Figure 4:
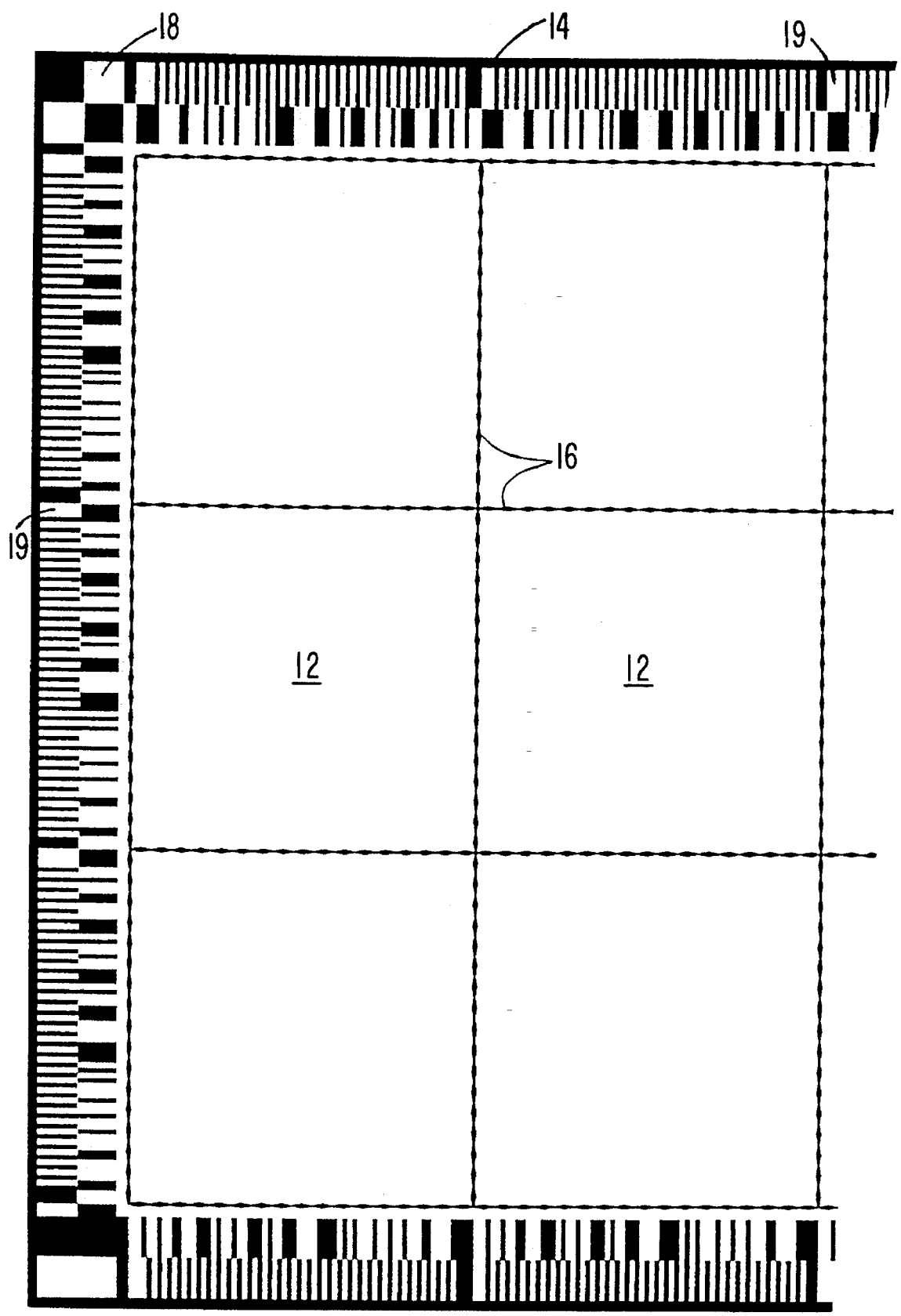
FIG. 4 is a partial view of a data array with null-data fields.

FIG. 4 shows an array 10c with fields having patterns of "null data". Only the organizational elements remain visible.

Figure 5:
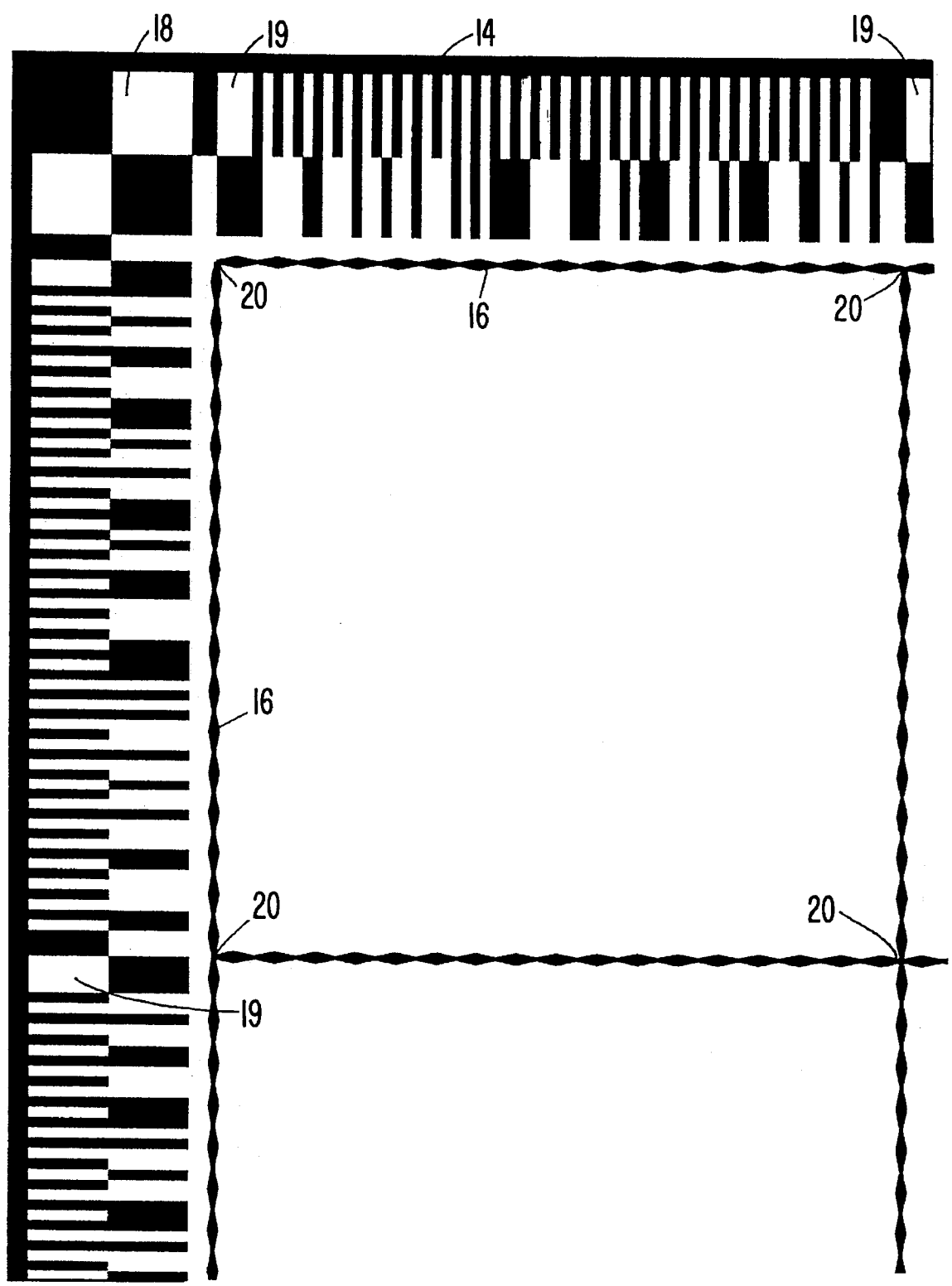
FIG. 5 is a fragmentary view of a corner of the array of FIG. 4.

FIG. 5 is an enlarged view of a portion of FIG. 4. The zig-zag in the outlines of the synchronization lines 16 is more evident. The phases of the zig-zag on both sides need not be mutually aligned in any particular way. A mutual half-phase shift, as shown, has the appearance of a "tapeworm".

Once more, only organizational elements are visible in FIG. 5, because all data elements have been defined to be white dots for purposes of illustration.

The greatest insight into the invention can be gained by considering three functionalities separately, using a graphic element as illustration for each, ignoring for the moment the essential connection between the functionality and the element.

Synchronization Lines

The synchronization lines are essential components of the present invention. The hitherto known, if not widely employed, systems focus chiefly on the opto-mechanical synchronization of the reading apparatus itself.

The system of the present invention relies on unsynchronized low-cost image scanners. It does so by carrying its own synchronization data through the scan, to be processed by software after scanning. The synchronization lines 16 shown are one possible graphic configuration of such synchronization data. Each synchronization line consists of a black line bounded on each side by a white band which allows the line to be recognized. In practice, synchronization elements are placed appropriately and periodically throughout large area data patterns. Once the position of each of these reference elements has been determined by the decoding process, each dot of the entire pattern has its reference elements close enough for the expected errors to remain well within one radius of a data dot.

The figures show a network of lines 16 dividing a large data area into smaller sections or fields 12. The method of synchronization involves calculating the position parameters of each of the four lines 16 bordering a data section by means of a statistical regression and computing their four corner intersections 20. These intersections 20 in the corners of the fields represent the reference points for the mathematical location of each data dot within the respective field. The relative x,y position of each data dot within those four corners is exactly defined by the pattern design. The absolute position of each dot is deducible from its defined relative position within the layout and computed reference points. A linear interpolation procedure will yield the presumed dot coordinates. Linearity failures would be one cause of discrepancy between a dot's real position and its presumed position, where the discrepancies would increase with growing distance of the reference points from the dot. This explains why dimensioning the data small enough is the proper way to keep linearity failures below a critical threshold.

The precision of locating the corner coordinates is important in terms of the achievable data densities. Like any slack in the system, errors in calculation of the corner coordinates must be taken up by correspondingly increased dot radius, and any increase in dot radius reduces data density.

The proposed method of locating synchronization references is a statistical one. It works best by avoiding both parallelism (hence the zig-zag) and common periodicity between synchronization elements and the scan grid. The latter is avoided by selecting a phase length for the zig-zag that is not a simple multiple of the scan resolution. In other words, the statistical nature of the locating method recommends that a maximum of randomness or a minimum of phase coincidence be achieved.

With scanner resolutions not significantly finer than the data dot screen, zig-zagging of synchronization line borders benefits data density per unit area. Straight-edge lines will also work, but less reliably or equally reliably only with larger data dots. The zig-zag therefore permits maximum data density.

FIGS. 6A–6D show an example of the performance advantage of using synchronizing lines having zig-zag edges under a particular set of circumstances. In each of FIGS. 6A–6D, the scanning direction is assumed to be parallel with lines 40. The cross-lines 42 form a grid with lines 40, the squares of the grid representing the locus of a scanner reading.

In FIG. 6A, line A-B represents the central axis of a straight line 44 with parallel edges which will be considered for use as a synchronizing line. Line 44 is two scanner resolutions wide and is shown slightly misaligned with respect to the scanning grid. A particularly unfavorable condition results as a consequence of the scanning grid's misrepresenting the actual position of the line's edges over extended portions of the line.

FIG. 6B shows the computed axis A'-B' of the line in the scanned image. The slant of line 44 is too shallow for the scanner to resolve and the scanning grid therefore locks the image of the line into alignment with the result that the computed axis is not a good approximation of the real axis.

FIG. 6C shows a synchronization line 46 with an axis C-D, line 46 having zig-zag edges. Otherwise, line 46 has the same position and orientation with respect to the scanning grid as line 44.

FIG. 6D shows 'the computed axis of line 46 in the scanned image. The zig-zag effectively randomizes the scanning grid's sub-resolution errors and so the errors cancel statistically along the line. The result is that the computed axis of line 46 is a much better approximation of the axis of the real line 46.

The frame 14 carries enough information to distinguish it from the frame of some other element which might appear in a publication, such as an advertisement, and to furnish an overall indication of scale and internal structure of the contained material.

Turning now to the data-dot screen, the binary information entity, the bit, is graphically represented by one data dot. The dot is pictured black or white, depending on whether the bit is set or clear, "1" or "0" (or the other way around).

Figure 7:
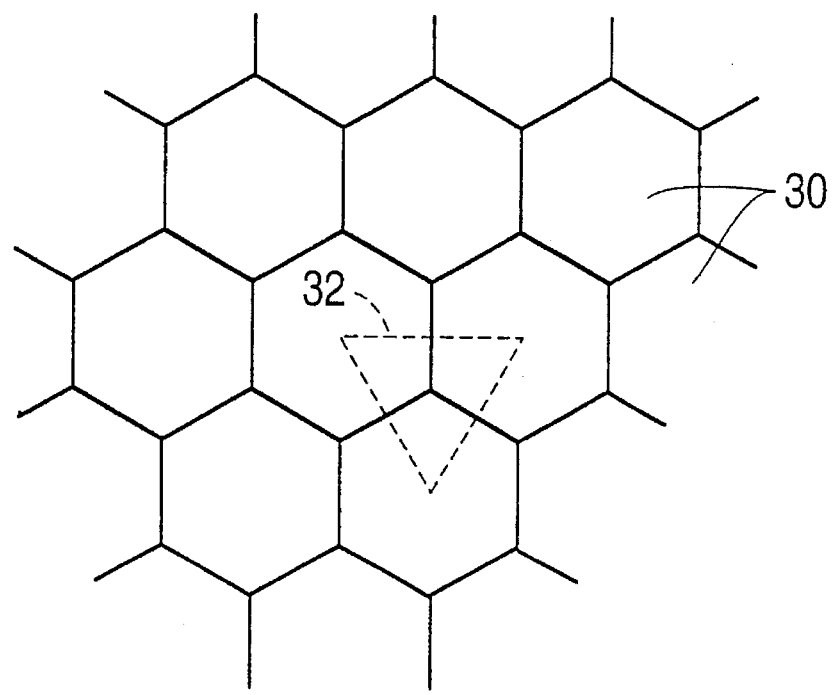
FIG. 7 is a greatly enlarged partial view of a data field in which data dot locations are arranged on a triangular basis.

FIG. 7 illustrates a triangular arrangement of dot locations 30 which means that the centers of the dot locations are at the vertices of equilateral triangles such as triangle 32. There is no space between dot locations or rows of dot locations. Thus, in FIGS. 2–6, the greatly enlarged dot representations appear as hexagons which, in a triangular arrangement, would fill all available space completely. However, as a practical matter, printing equipment will not produce accurately formed geometrical shapes at the scale of one individual data dot. The dot arrangements are therefore characterized in terms of layout grids rather than dot shape.

Figure 8:
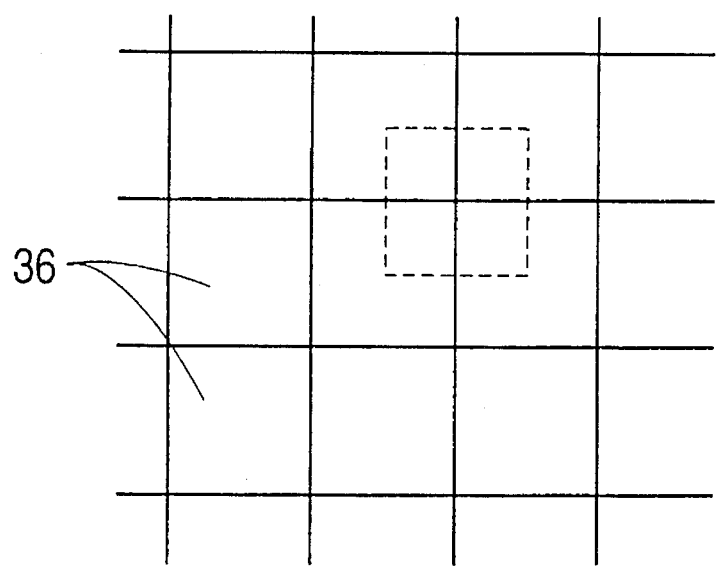
FIG. 8 is a greatly enlarged view similar to FIG. 7 in which the data dot locations are arranged orthogonally.
Figure 9:
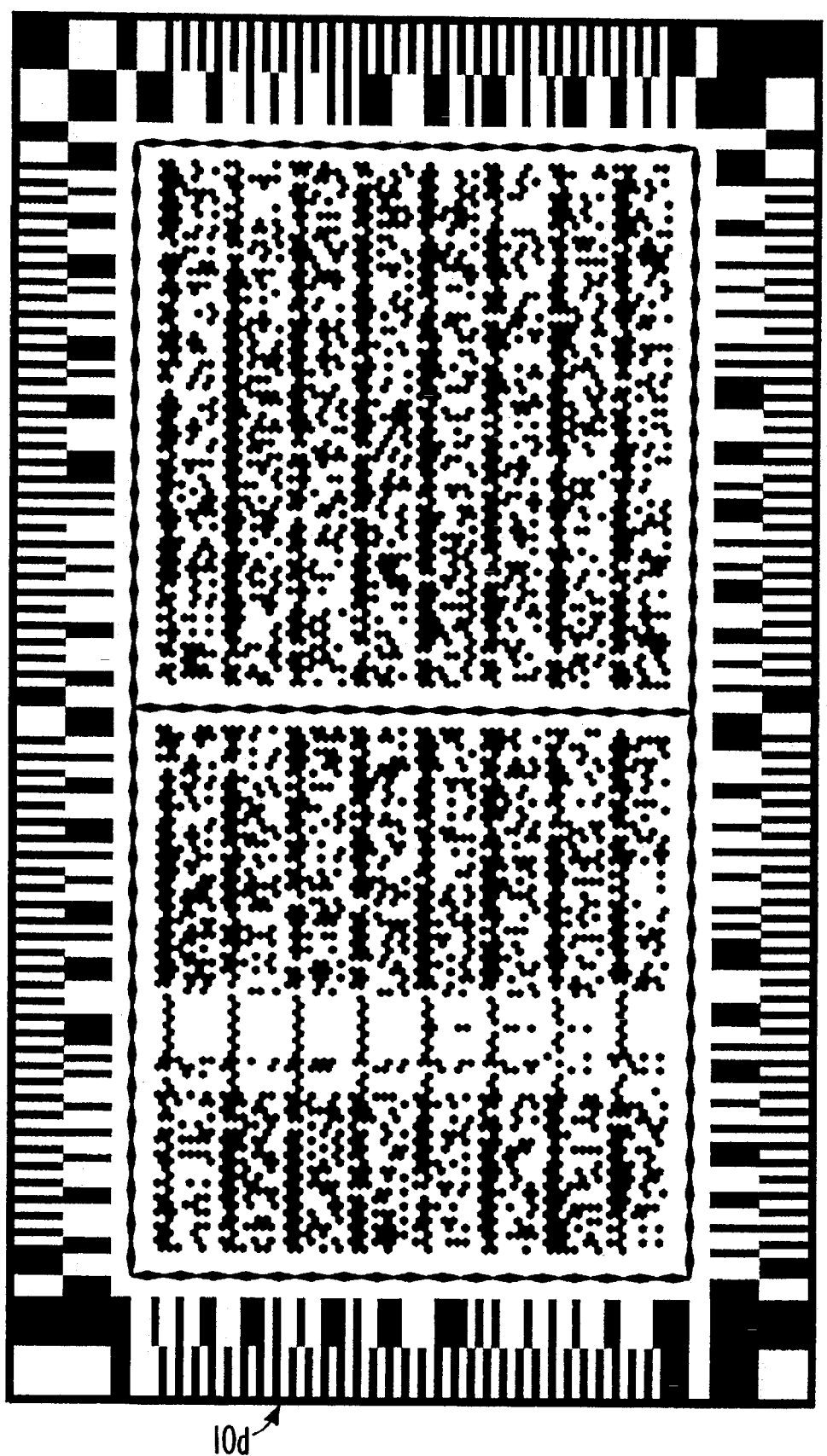
FIG. 9 is a view of a data array in accordance with the invention using a triangular arrangement of data dot locations in accordance with FIG. 7.

A triangular arrangement 32 and a rectangular or orthogonal arrangement of dot locations 36 are shown in FIGS. 7 and 8, respectively. As mentioned above, the orthogonal arrangement is more suitable for printing with a lower resolution printer such as an office laser machine. FIG. 9 shows an array 10d with a triangular dot arrangement, on the basis of the arrangement of FIG. 7, in an entire pattern.

In the conversion of binary data to a graphic pattern of a specific form, an orthogonal network of lines is constructed so as to divide a rectangular area into a typically two-dimensional array of rectangles, preferably squares, the aspect ratio of the area having been selected by the operator in section units. The overall line width is at least two scanner resolution units. Each of the edges follows a zig-zag course having an amplitude, as measured from the center of the line, of at least one scanner resolution unit. Optimum periods or phase lengths for the zig-zag are those that avoid falling in step with the scanner's synch grid over very short distances. In a preferred embodiment, the opposite edges zig-zag in counter-phase so as to be symmetrical about the line axis. The line, consequently, alternatingly thickens and thins.

The described lattice of lines will serve as a geometric reference grid providing each square with its own local coordinate system. These lines constituting the grid are referred to as "synchronization lines".

The whole array of squares is then enclosed within a rectangular frame containing marks that, by their shape and placement, provide information on the structure, orientation and dimension of the pattern's contents (field type, field dimension, dot arrangement, etc.). These marks also contribute significantly to the identification of the pattern as valid data in contrast to extraneous graphics.

Thus far, the graphic elements whose task it is to convey structural or organizational system information has been described. The data proper is then filled into the individual squares in the form of two-dimensional arrays of fine dots, arranged contiguously in contiguous rows, so that the entire data area is completely covered with a screen of dot data. There is no space between the rows of dots. Each dot represents one binary data unit, one bit, and is represented either black or white, depending on the value of the equivalent bit which it represents. The geometry of the entire grid is exactly defined in terms of system parameters. So, each dot has its known relative position with reference to the synchronization lines enclosing the field. The size (diameter) of the dots typically is on the order of two or three scanner resolution units.

The binary data, prior to its conversion, is preferably pre-processed in several ways: its volume is compressed by redundancy removal, it is de-serialized, system data is added, such as system parameters and data identification and, finally, error-correction redundancy is also added.

In the extraction of the original binary data from the graphic pattern, the printed pattern is converted to an image bit map by means of an image scanner and is stored. Once the image is stored, all subsequent steps are performed on the stored bit map. Unlike constructing a pattern, decoding it is a process with a definite sequentiality because the goal is to look at all data dots in the order in which they occur and inspect their color, black or white. In order to do this, the location of each individual data dot must be determined. But since the data dots can only be found relative to a local coordinate system defined by the synchronization lines, each one of those lines has to be processed first through a linear regression calculation. That, again, can only happen after the approximate location of the lines has been determined by interpreting marks in the frame, which, again, presupposes that a frame has been found. In summary, a sequence of locating procedures must be executed, each step of which receives location information of a certain precision from the preceding step and passes improved location information on to the next one.

Figure 10:
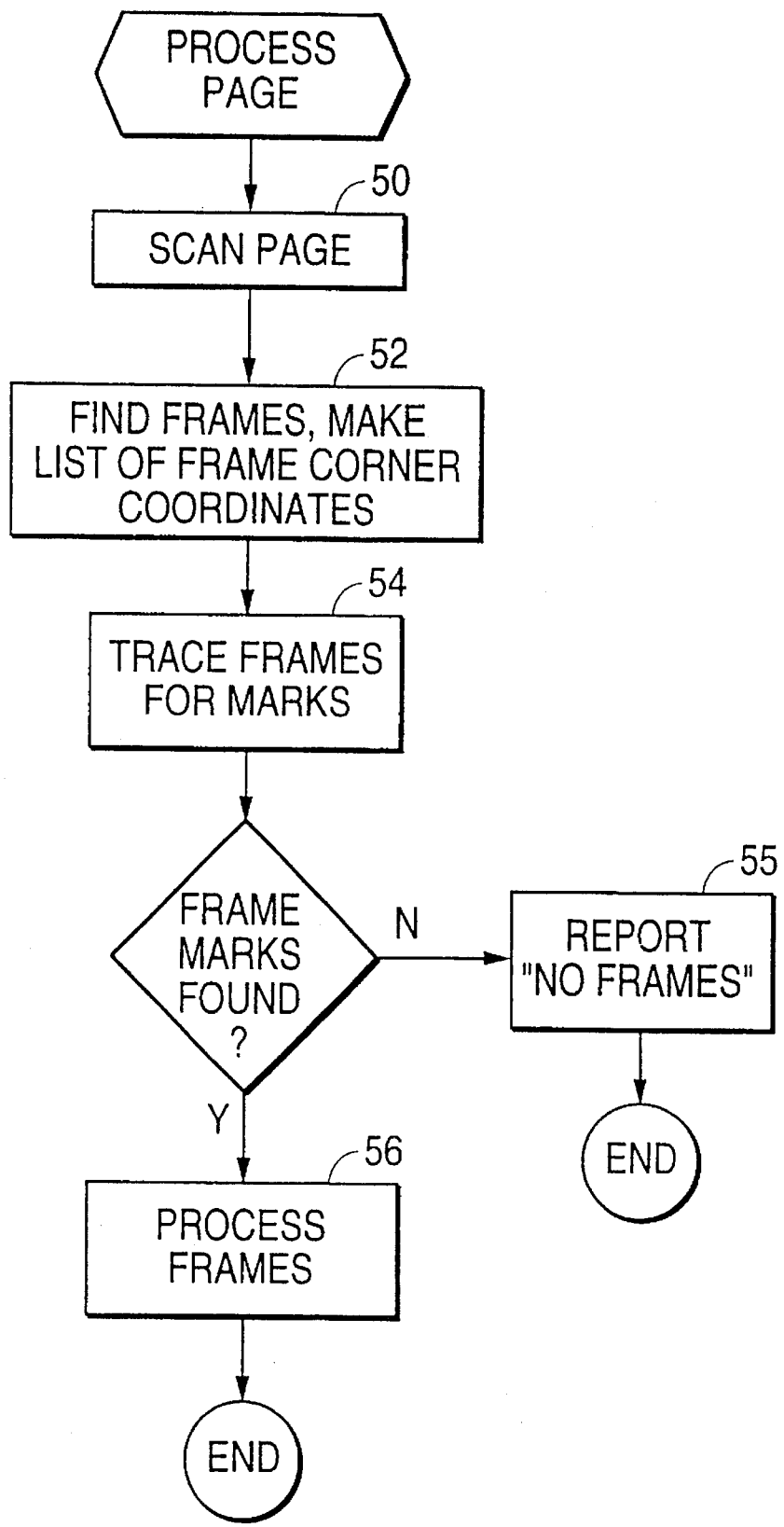
FIGS. 10 and 11 are flow diagrams illustrating steps in the processing of the present invention.
Figure 11:
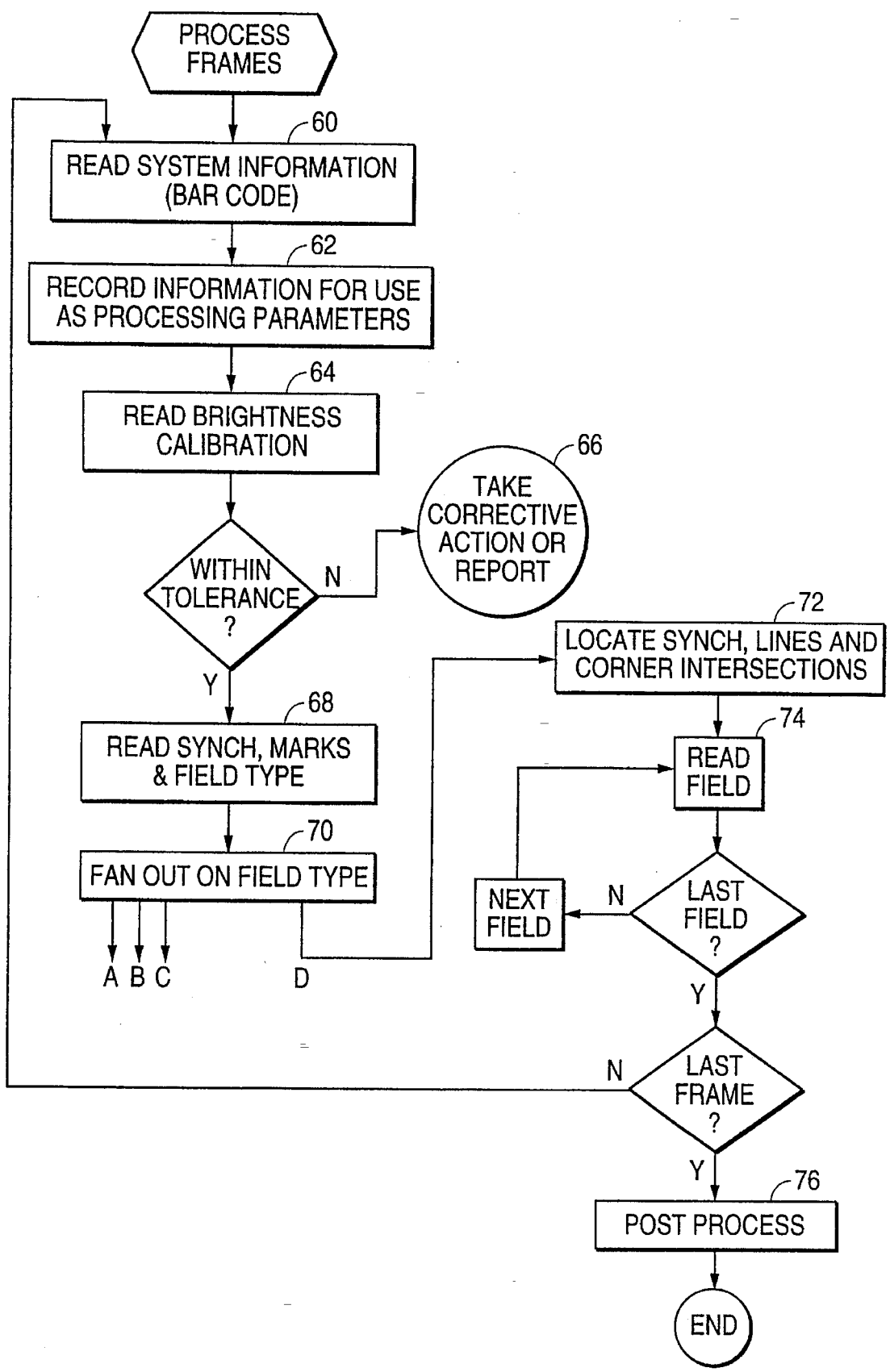

Following is a step-by-step account of the decoding process with reference to FIGS. 10 and 11. The coordinate system is that of the bit map. Each point in this coordinate system represents one scanner reading. The points are spaced one scanner resolution unit apart from one another. The Y-coordinate identifies the sequential positions of the scan lines on which the points lie and the X-coordinate identifies the sequential position of the point in the scan line.

First, a page is scanned, 50, and a graphic bit-map generated and stored in computer memory. The result is an image file wherein each reading, i.e., each point, can be addressed through two coordinates in scan resolution units (X and Y, or scan column and scan row, respectively). All steps after this are performed on the bit nap in memory.

To find a frame, 52, a sample of scan lines, equally spaced at an interval just close enough to guarantee catching the smallest possible data pattern, is examined, bit by bit. Each color transition encountered in this examination initiates an edge-tracking procedure following along the transition. Edge tracking is immediately abandoned the moment the tracked edge is found not to be rectilinear over an appropriate distance, except for ninety-degree turns in the expected direction. When edge tracking reveals four corners and returns to the starting position, a potential frame has been identified and its location has been determined by the coordinates of its corners which are stored.

The potential frame is traced for marks, 54. If none is found, the frame is rejected as an extraneous pattern, 55, and "no frame" is reported. The frame-finding procedure resumes until it reaches the end of the page. The term "tracing" means reading in the bit map of the captured image along a straight line from a given starting point to an end point. Algorithmically, this translates into iteratively incrementing bit map coordinates in a number 'n' of equal steps from start to end, the stepping interval being selected to suit the resolution requirements of the analysis being performed. By inspecting the color of the pixels found at each step, various kinds of information can be gleaned: the transition points between stretches of different color may yield positional information; their relative lengths or their number may yield numeric information and their order of occurrence may yield orientation information.

If frame marks are found, the frame is processed. The steps of this processing are shown in more detail in FIG. 11. 'Tracing the frame' involves tracing parallel to the frame's perimeter at some inbound distance where the trace will intersect markings, a process generally similar to the way a bar-code reader intersects the stripes of a bar code. The system information is read, 60, and the system information gained from the reading is recorded for further use as processing parameters 62.

The minimum information which the analysis of the frame must yield is information identifying the structure of the array of fields. This is location information. Unless the type of dot arrangement and the dimension of the field(s) expressed in number of dots are pre-defined default values, parameters giving these values must be conveyed by the frame.

Information deemed essential because of its great usefulness in terms of decoding efficiency is pattern orientation data and black-to-white balance.

Desirable but optional information, which the invention has the capacity to convey, includes system identification data, pattern or contents identification data, user guidance data, data to guide automated machinery, and foreign data pertaining to the control-of interfaces or of interfacing systems.

Once a frame has been identified, decoding efficiency recommends evaluating the black-to-white balance of the bitmap, 64. If that balance differs from a desired value beyond some limit of tolerance, the bitmap is recognized as not decodable and a re-scan with a corrected brightness setting is indicated, 66. The frame element permitting the evaluation of the black-to-white ratio is a strip having a large number of cross stripes of equal widths and alternating color. A trace along the axis of such a strip ideally yields two pixel counts, one for each color, that are close to equal. An out-of-balance black-to-white ratio is evidence of a bitmap that represents the dots of one color too small and so would unduly tax the coping capabilities of the dot-location procedures.

The synch marks and field type are read, 68. Because there are different types of fields possible, a different specific routine must be provided for each field type, 70, although each routine follows the same general steps at the block level. Once the structure of the data area has been identified, decoding it is a repetitive operation of decoding individual fields.

Decoding a field begins with deducing the geometric straight-line parameters of each of the four bordering synchronization lines, 72. This is accomplished on the basis of the preliminary straight-line parameters which the analysis of the frame has yielded: a rectangular area is defined extending along the presumed line axis and stopping just short of the presumed intersection point at either end. Laterally, the area is bounded on either side at the presumed middle of the neutral zone separating the synchronization line from the data area. Each pixel within the area so bounded is then examined. The coordinates of the pixels recognized by their color as forming part of the line are fed into a linear regression routine which yields straight-line parameters of considerable accuracy.

Intersecting now the four straight lines mathematically yields accurate coordinates of the four points in the field's corners where the bordering synchronization lines cross.

The data in each field is then extracted, 74, by stepping through the field dot by dot along the rows and row by row from top to bottom, and recording the color of each dot, one color signifying the binary value 0 and the other color the value 1. The type of dot arrangement and the dimension of the field in number of dots determines the stepping increments. Algorithmically, the procedure is the two-dimensional equivalent of the tracing procedure described above with the added complexity that every time a new row starts a (small) correction vector is added to the vector increment defining the distance from one dot to the next. Without this correction, the iteration would proceed on the idealized grid of a parallelogram. The correction compensates for the normally minute discrepancy that exists between the real field as measured and an idealized field having perfectly parallel sides. The procedure amounts to a linear geometric interpolation of so many intervals between four vertices of arbitrary placement.

The synchronization lines are then located with precision, 72. The frame marks 19 indicate the locations of the synchronization lines accurately enough to identify zones in which the synchronization lines must lie. These zones are presumed to encompass the synchronization line as well as the entire area between the medians of neutral zones of uniform color on opposite sides of the synchronization line itself. The neutral zones are those areas between the synchronization lines and the data fields and are of opposite color from the lines. This guarantees that the line will lie inside the zone and no data will. In the direction of the line axis we delimit the zone to lie between intersections. In this way we define a synchronization line section referencing an individual data field next to it. The exact location of the line is then determined by inspecting all scanner readings in that zone. The coordinate readings belonging to the synchronization line (typically black) are fed into a linear regression function. By the time the entire zone is processed in this manner, the regression function yields the geometric position of the synchronization line axis in the coordinate system.

The corner intersections of the four synchronization lines surrounding the data field are located mathematically from the intersecting line coordinates. The result is four pairs of coordinates that, in bit map coordinates, are accurate to fractions of a resolution unit.

The next step involves reading the data dots, 74. The field type being known from the corresponding frame marks, the exact geometry of the field structure is known. Consequently, each data dot's position can be calculated by linearly interpolating its relative position within the four reference corners. Decoding the entire field consists in sequentially tracing all the dot rows that make up the field. The operation is a simple iteration process whose essence is the repeated addition of constant coordinate increments.

After reading a field, the program looks to see if there is another field to be read and, if so, looks for another frame until all fields and all frames have been read.

The reconstituted raw data is post-processed, 76, in reverse order of the pre-processing: error correction with report of success or failure of extraction, report or recording of system data or both, re-serialization, and decompression. The post-processing can also be tailored to the nature of the system, in which case step 76 would constitute a fan-out to the particular kind of post-processing needed.

Figure 12:
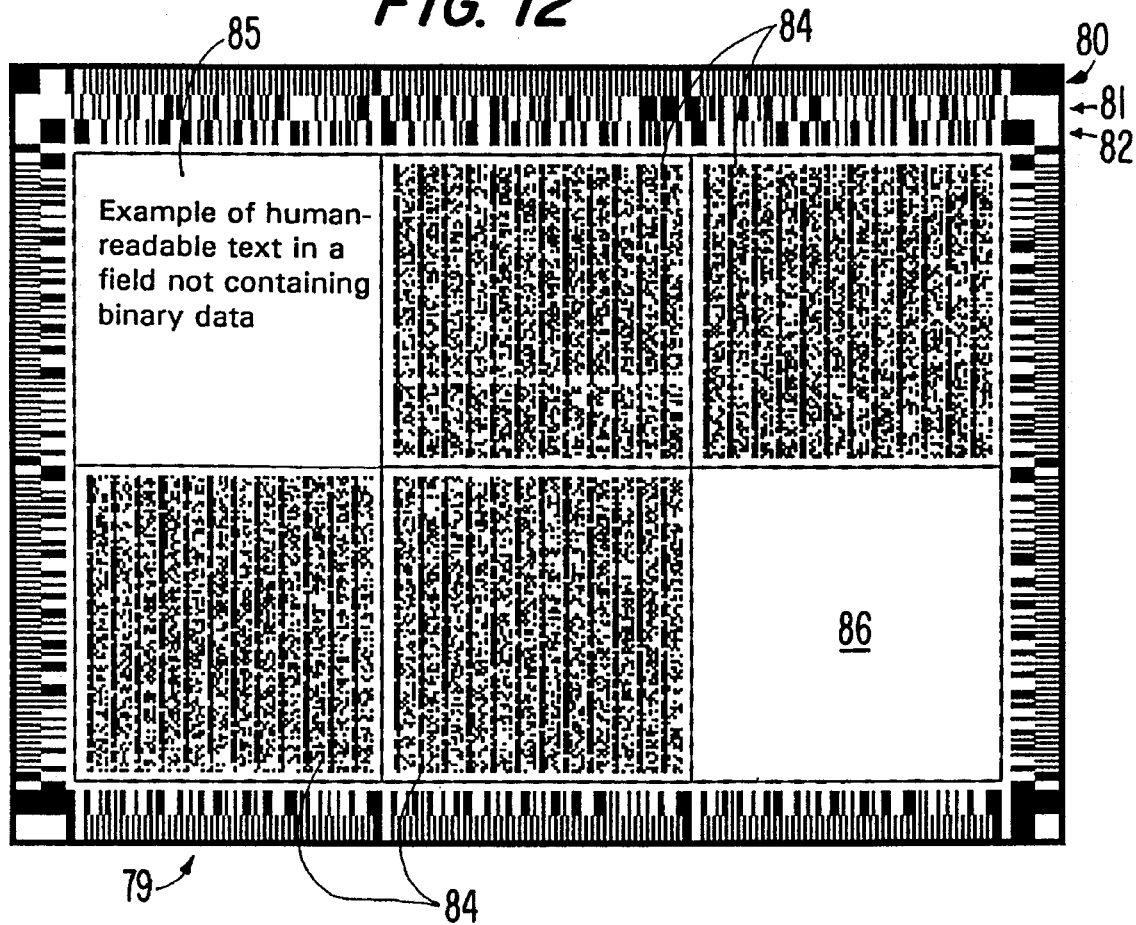
FIG. 12 is a view of a data array showing the structure of an information-containing frame.

FIG. 12 shows one suitable arrangement for including calibration and system information in a frame 79 of a data array. In addition to the orientation and synch line marks 18 and 19 as discussed in connection with FIG. 2, the frame 79 includes three frame components 80, 81 and 82 each having regions with additional information. Frame component 80 forms the outermost layer of the frame, frame component 82 forms the innermost and frame component 81 is sandwiched between the other two.

As mentioned, reading binary data is more error-critical a process than capturing picture data. Brightness mis-calibration is one possible source of error. In the context under consideration, brightness calibration deals with the scanner's response to readings that fall neither wholly into a black or into a white area but on a contour between black and white. On such a position the scanner's photo sensor will "see" a gray color, either a dark gray, if the reading is predominantly in the black, or a light gray if it is predominantly in the white. The scanner will interpret light gray as white, dark gray as black and will discriminate between light and dark according to its brightness calibration setting. Adjusting that setting involves moving the scanner's threshold of distinction between black and white up and down on a gray scale. Thus, the distinction between dark and light is a question of brightness calibration. The effect of an imbalanced brightness calibration is equivalent to a shift of the perceived contour toward the black or the white side. Such an apparent shift will cause the scanner to over- or underestimate the size of small elements, an effect that is highly critical to the successful interpretation of fine data screens.

Accordingly, black and white reference areas of equal size, preferably located in the frame, should generate an equal amount of white and black readings. For this purpose, the outermost frame component 80 has a sequence of four calibration strips filled with uniform and alternatingly white and black stripes which are read in step 64. Tracing along these calibration strips and keeping separate counts of the white and black pixels reflects presence and magnitude of a black-to-white bias in the ratio of the two counts. Any imbalance between the respective number of white and black readings can be measured and the value used for correction. This method will correct an effective black to white bias that is the sum total of the three components: dot size bias due to ink flow variations in the printing press, scanner brightness and non-symmetric albedos of the two pattern colors in terms of their gray-scale equivalents.

Frame component 81 includes system identification information so that, in step 70 (FIG. 11) the appropriate choice can be made without the analyzing system having to deduce what system is involved. Preferably, component 81 identifies the dot array system used in each field and can also be used to contain other information.

As shown in FIG. 12 and as mentioned above, the fields can be of various types such as the dot screens 84 which are discussed above in detail; a text field which could identify the data in human-readable form; a combination of text and graphics, as suggested at 85; a null field 86; bar codes, etc. Whichever system is involved in each field is identified in component 82 and, in addition, component 80 carries the marks like marks 19 for locating the synch lines. Again, frame component 82 includes four strips making up the inner layer of the frame.

Figure 13:
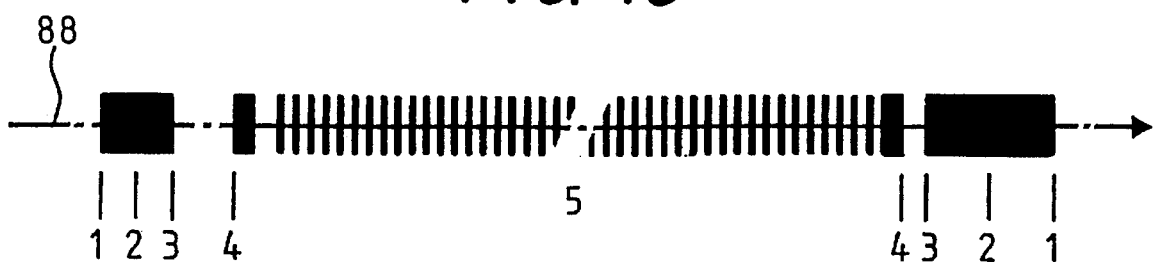
FIGS. 13, 14 and 15 are enlarged illustrations of data in the frame as it is shown in FIG. 12, which includes an optional data strip.
Figure 14:
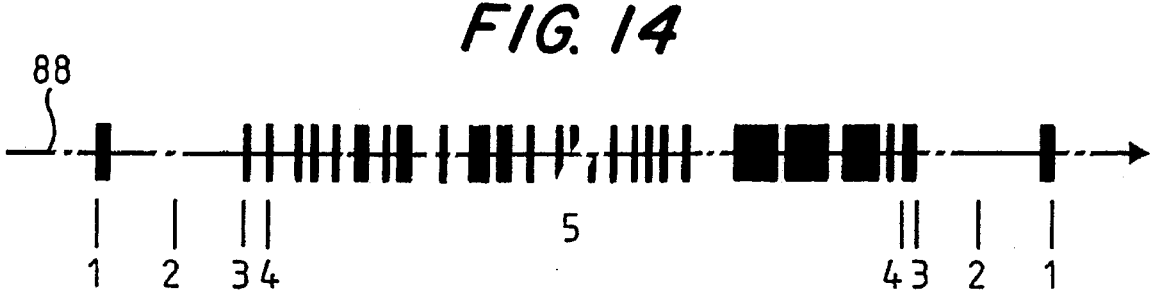
Figure 15:
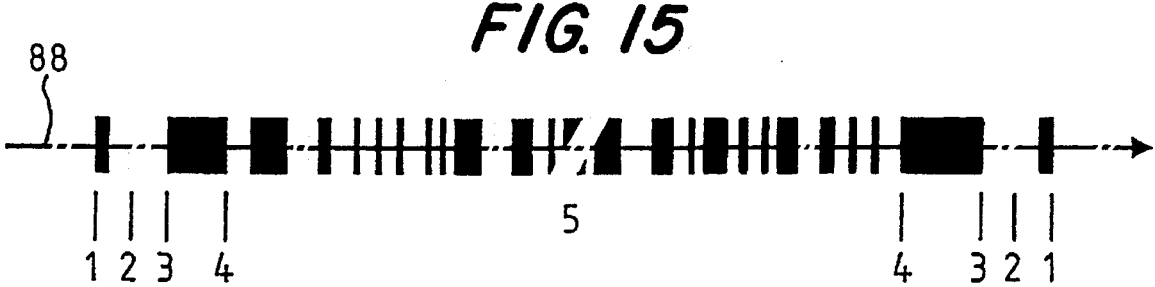

Individual strips forming sides of each of the frame components are shown in FIGS. 13, 14 and 15 in foreshortened form. The leading and trailing ends of each of the frame components include white and black sections which form an orientation code as discussed in connection with FIG. 2. The frames are read in the tracing process mentioned above in which the component is read along its axis, starting at either end, along a line 88 which is not actually part of the frame and is included in the figures only to show the path and direction along which the frame is traced. The color transitions (black/white) yield width measurements which give the orientation and system information.

Tracing a calibration strip, as shown in FIG. 13, involves the following process in which the numbers correspond to those on the figure.

1. Move up to the beginning of the frame from the outside at one end which locates the beginning of the strip.
2. Move to the approximate center of the first square; at this point the color of the initial square is known.
3. proceed to the next color transition, giving the width of the component strip.
4. proceed to the next color transition, giving the width of the frame perpendicular and the beginning of the calibration pattern. Repeat 1, 2, 3 and 4 at the other end; then
5. Proceed through the calibration pattern, giving feedback information for calibration.

Tracing the other frame component strips:

1. Move to the beginning of the frame from the outside at one end, giving the beginning location.
2. Proceed to the approximate center of the first square which gives color information.
3. Proceed to the next color transition which gives the width of the frame perpendicular.
4. Proceed to the next transition which is the beginning of the data. Repeat at the other end, if necessary; then
5. Proceed through the data.

These tracing processes will yield the following information:

a. Pattern orientation (with redundancy),
b. width of frame component strip (with redundancy),
c. width of frame line perpendicular (with redundancy), and
d. the data obtained from the strip.

While the invention has been discussed in terms of printing the data arrays on paper, and while that is regarded as being an especially useful format for the invention, it should be recognized that it is not the only format. Film and other media are also usable with the invention and the areas of light and dark can be reversed if that is more convenient in a particular medium.

While certain advantageous embodiments have been chosen to illustrate the invention, it will be understood by those skilled in the art that various changes and modifications can be made therein without departing from the scope of the invention as defined in the appended claims.

What is claimed is:

1. A method for graphically representing binary data in a condensed, high-density, machine-readable form, comprising the steps of forming a pattern of information-carrying graphic elements defining a geometric reference system, the reference system including a substantially continuous frame having a selected width and a plurality of synchronization lines within the frame defining boundaries of at least one data field;

placing a plurality of machine-readable marks within the width of the frame identifying the pattern as a data-field reference system and providing information about data to be included in the system, and substantially filling the at least one data field with a plurality of binary data-transmission elements each characterized by the presence or absence of a machine-readable mark at each of a plurality of contiguous binary data element locations, each binary data element location having a known geometric relationship to the reference system so that coordinates of each of the plurality of individual binary data elements can be accurately determined.

2. A method according to claim 1, wherein the synchronization lines define a plurality of fields and wherein the method includes the step of selecting an arrangement for said fields relative to each other and shaping the frame to surround the selected arrangement of fields.

3. A method according to claim 2 wherein the synchronization lines are orthogonal.

4. A method according to claim 2 and including forming the synchronization lines with edges which repetitively and substantially linearly diverge and converge relative to each other.

5. A method according to claim 2 and including forming the synchronization lines with stepped edges.

6. A method according to claim 2 and including incorporating in the machine-readable marks within the width of the frame information describing the type of binary data carried by the elements and defining orientation thereof to indicate a beginning location of the reference system.

7. A method according to claim 6 wherein the binary data-transmission elements are arranged in the field in a selected geometric format, the method including incorporating in the machine-readable marks within the width of the frame information describing the geometric format of the binary data-transmission elements.

8. A method of transporting binary data comprising the steps of printing the binary data graphically on a medium in a condensed, high-density, machine-readable form by
        forming a plurality of first information-carrying and pattern-organization graphic elements to provide a geometric reference system from which the coordinates of each of a plurality of individual binary data element locations can be derived mathematically, and
        substantially filling a selected region in the reference system with a plurality of binary data-transmission elements at the locations, each element being characterized by the presence or absence of a machine-readable mark, the binary data element locations having known relationships to said first elements;

transporting the medium;

optically scanning the medium and forming a bit map of the pattern including the first and binary data elements, evaluating the first elements to determine the orientation and locations of the binary data elements, and reading the binary data elements, and wherein the step of evaluating includes tracing a frame portion of the bit-map image of the first elements to determine the orientation, tracing synchronization line portions of the bitmap image of the first elements to identify intersections of the synchronization lines, and then determining the locations of the binary data elements from the intersection locations.

9. A method of graphically storing binary data in a condensed, high-density, machine-readable form, comprising the steps of printing on a selected medium a pattern of information-carrying graphic elements defining a geometric reference system including a plurality of synchronization lines defining boundaries of an enclosed data field and a frame surrounding the synchronization lines, the frame including a plurality of machine-readable marks identifying the pattern as a data-field reference system, and substantially filling the data field with a plurality of binary data-transmission elements each characterized by the presence or absence of a machine-readable mark at each of a plurality of binary data element locations located next to each other with no spaces between said locations, each binary data element location having a known geometric relationship to the reference system so that coordinates of each of the plurality of individual binary data elements can be determined.

10. A method according to claim 9 wherein said selected medium is a sheet of paper and wherein said binary data elements and said reference system are printed concurrently.

* * * * *